April 18, 1933.  J. L. ANDERSON  1,904,599
METHOD OF WELDING AND APPARATUS THEREFOR
Filed Oct. 29, 1930  5 Sheets-Sheet 1

April 18, 1933.  J. L. ANDERSON  1,904,599
METHOD OF WELDING AND APPARATUS THEREFOR
Filed Oct. 29, 1930  5 Sheets-Sheet 2

INVENTOR
James L. Anderson
BY
ATTORNEY

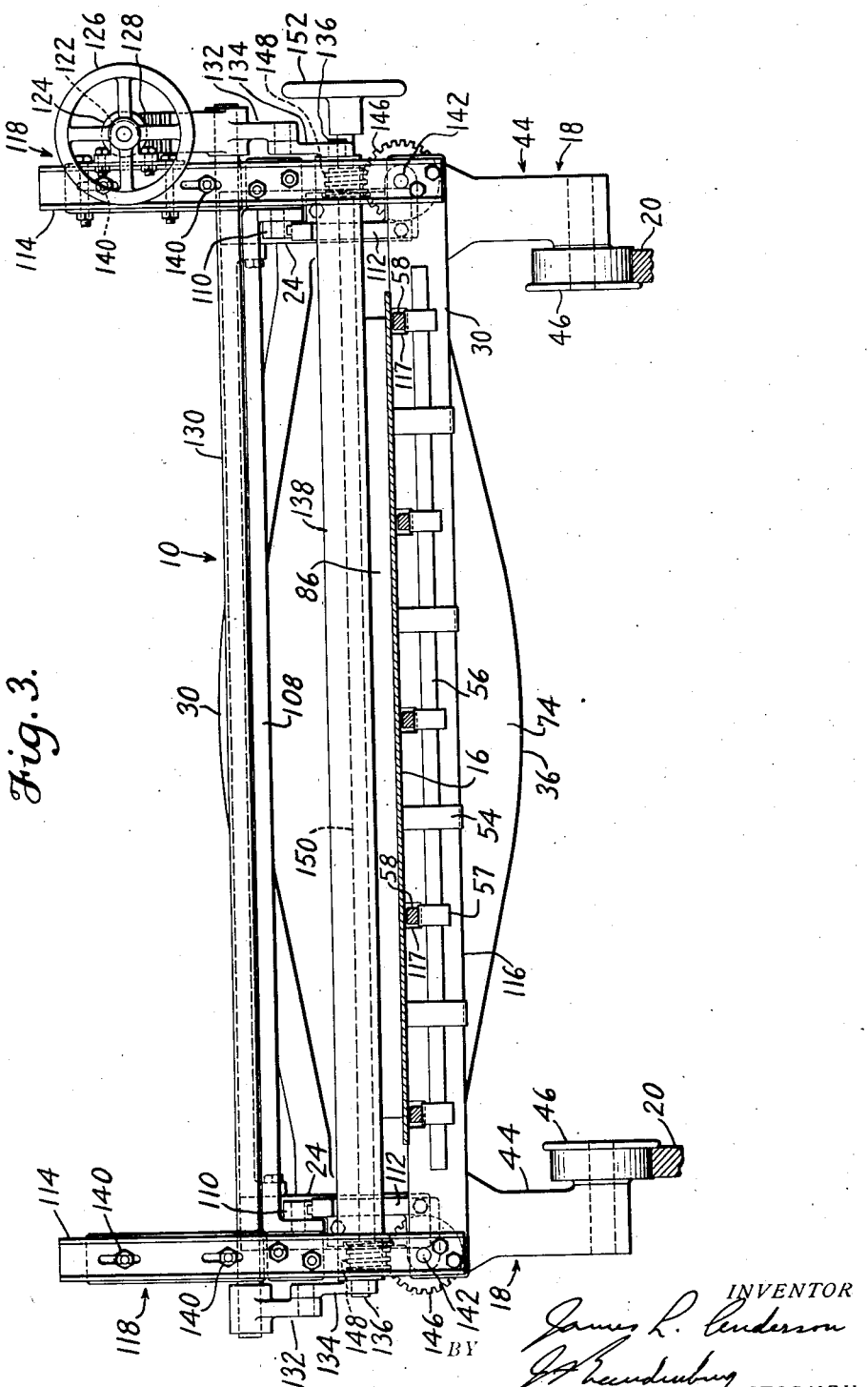

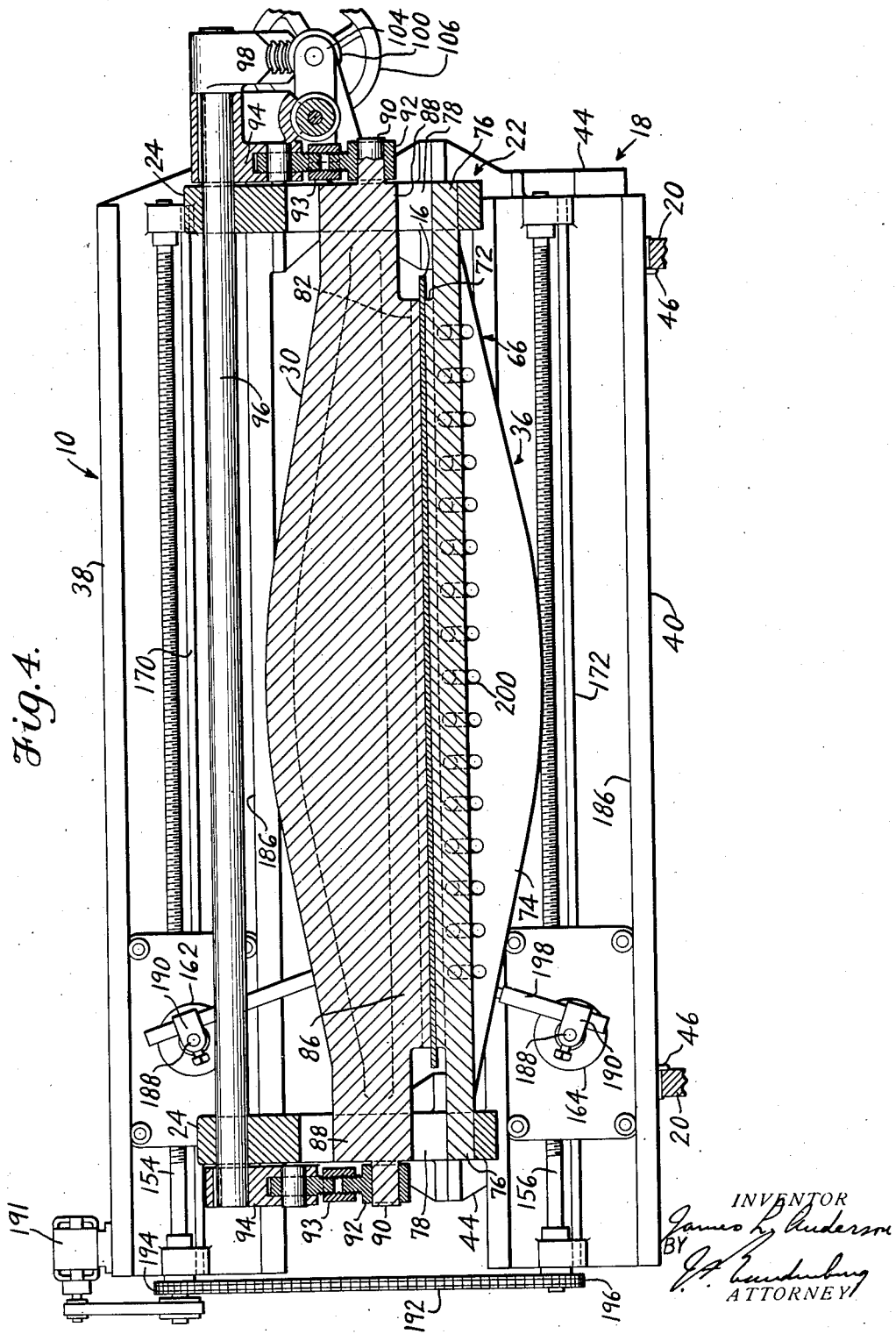

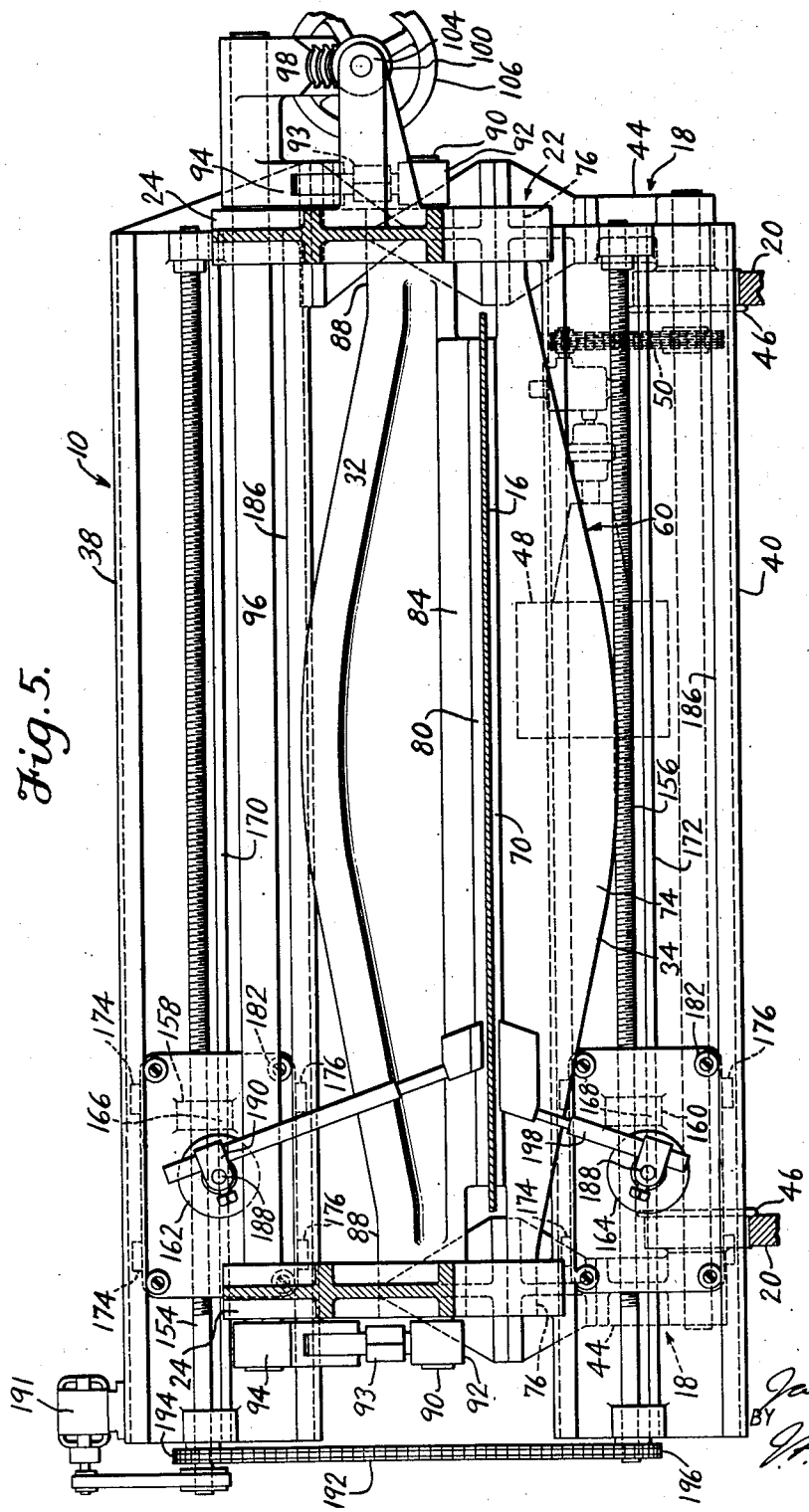

Patented Apr. 18, 1933

1,904,599

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

METHOD OF WELDING AND APPARATUS THEREFOR

Application filed October 29, 1930. Serial No. 491,863.

In the manufacture of pipe from skelp or like metallic forms, it is desirable in order to reduce the cost of manufacture to utilize methods wherein the machines for forming the sheet or plate metal into tubular form operate continuously, that is, such apparatus continuously receives a practically endless sheet or plate and bends or otherwise shapes it into a desired contour. The ordinary sheets or plates of commerce, however, are of predetermined and definite length, determined by the size of the ingot, bloom or billet from which it has been worked and the degree of reduction involved. Some method or means is required under these circumstances to unite into a substantially endless member such commercial sheets or plates.

It is an object of this invention to provide a method, and apparatus for effecting such method, whereby the assembly into a single continuous member of a plurality of sheet or plate sections is accomplished. For this purpose it is desired to weld the sheet or plate sections together in end to end relation by fusing together abutted end edges of the sections. Apparatus is provided wherein the sections are received singly and are discharged as a continuous member, and provision is made to retain the sheet ends in proper association for welding.

It is an object of this invention to provide apparatus whereby, after the sections have been arranged in proper relation, the welding operation can be carried on continuously and substantially automatically with a minimum of supervision and attention.

It is an object of this invention to provide apparatus of the kind hereinabove specified in which, if sheets of plate thickness are being handled and it is desirable to heat the metal both from below and from above to insure a higher degree of heat penetration and more complete and thorough fusion of the end edges, welding devices can be supported both above and below the sheet edges operated upon.

It is an object of this invention to make possible the uniting of sheet or plate sections into a continuous member while the continuous member and a section are being advanced in longitudinal motion. For this purpose the entire apparatus is placed upon a carriage or carriages capable of movement parallel to the path of the moving section or member. Preferably the apparatus is freely mounted for movement along this path. In the simplest case, power for movement of the carriage is secured from the moving member or sheet section by rigidly clamping the end of the section or member to the movable carriage. However, some power means may be utilized to effect or assist in effecting such movement, relieving the moving member either partially or entirely of the work necessary to move the sheet. Such power means may also be applied to bring the apparatus up to the traveling member and to return it.

A particular object of the invention is to make it possible to add on sheet sections indefinitely without interrupting or materially changing the continuous motion of the resulting continuous member passing onward to and through the forming mechanism, and thence, it may be, to a pipe-welding apparatus. It is also an object to add on each new section accurately and integrally, so that the result is a continuity of material and form upon which the subsequent operations can be successfully and readily performed.

It is an object to bring the trailing edge of the continuous member and front edge of each additional section into accurate relation for cross-seam welding, while both are in forward motion, and without detrimentally affecting the continuous motion of the continuous or continually renewed member. It is also an object to clamp the proximate portions of the sheets close to the seam to be welded and entirely, or substantially entirely, across the width of the material, this being important for the production of sound and uniform unions at intervals across the continuous member which is fabricated.

In the apparatus of the invention two carriages are provided. These carriages can be moved freely, or can be propelled, forward or in the direction of movement of the material, and backward, after the cross-seam has been welded. The carriages can also be moved relatively to each other. They are preferably connected together, as shown, and have mechanism for effecting graduated overtaking movement of one relatively to the other. In the specific and most desirable embodiment one carriage is carried upon the other. On one of the carriages is the welding apparatus.

The carriages have means for clamping the continuously traveling member and the section to be added. Preliminary clamping having been effected, and both carriages being in forward motion, the carriage to which the additional section is clamped is moved faster than the other carriage which is moving in unison with the continuously moving member, until the sheet edges come into exact relation for welding. Then a final clamping is effected, and the cross-seam welder is set in operation.

The preferred mode of operation is to bring up an additional section, by hand or otherwise, to position it on one of the carriages while the carriages are stationary, then to apply a transverse clamp, which is on this carriage, close behind the front edge of the additional section, then to push or propel the carriages, if necessary, after the continuously traveling member, then to apply a clamp on the other carriage to the continuously traveling member, thus coupling the sheets together, then to operate the after carriage, while both carriages move forward, so that the clamped edge of the additional section is advanced into close proximity to, or into abutment with, the trailing edge of the other member, and then to apply another transverse clamp on the after carriage close in front of said trailing edge. The welding apparatus is supported in operative relation to the two proximate transverse clamps and operates between them along the cross seam.

However, the construction, arrangement and number of parts, and the order of steps may be varied without departing from the broader aspects of the invention.

Novelty in the method involves coupling an additional section to the continuously traveling member, and while the sheets remain coupled and in forward motion, adjusting the additional section into precise relation to the continuously traveling member, after which the welding is effected. The method also includes the transverse clamping of the sheets close to the edges to be united. Because of the location of the clamps in close proximity to the seam edges, the so-called envelope gases or the results of combustion in the case where a flame method of welding is used may not be allowed a sufficient opportunity to unite with atmospheric air close to the point at which the weld is to be produced. It is, therefore, an object of this invention to provide means whereby atmospheric air will have ready access to the vicinity of that portion of the seam being welded to effect burning of the envelope gases in proximity to that seam portion.

Other objects of this invention will be apparent from the description of the apparatus and from the drawings, or will be specifically pointed out therein.

The invention is not restricted to the details of construction and arrangement of parts herein shown and described, nor to the precise manner of carrying out the method, as the same may be modified in various particulars without departing from the spirit and scope of the invention, one practical embodiment of which has been herein illustrated and described without attempting to show all the various forms and modifications in which the invention might be embodied.

On the drawings, in which is disclosed a preferred embodiment of apparatus for effecting the invention:

Fig. 3 is an end elevational view of the apparatus, the sheet and rails being shown in section;

Fig. 4 is a transverse sectional view on the line 4—4 of Fig. 1; and

Fig. 5 is a transverse sectional view on the line 5—5 of Fig. 1.

Figure 1:
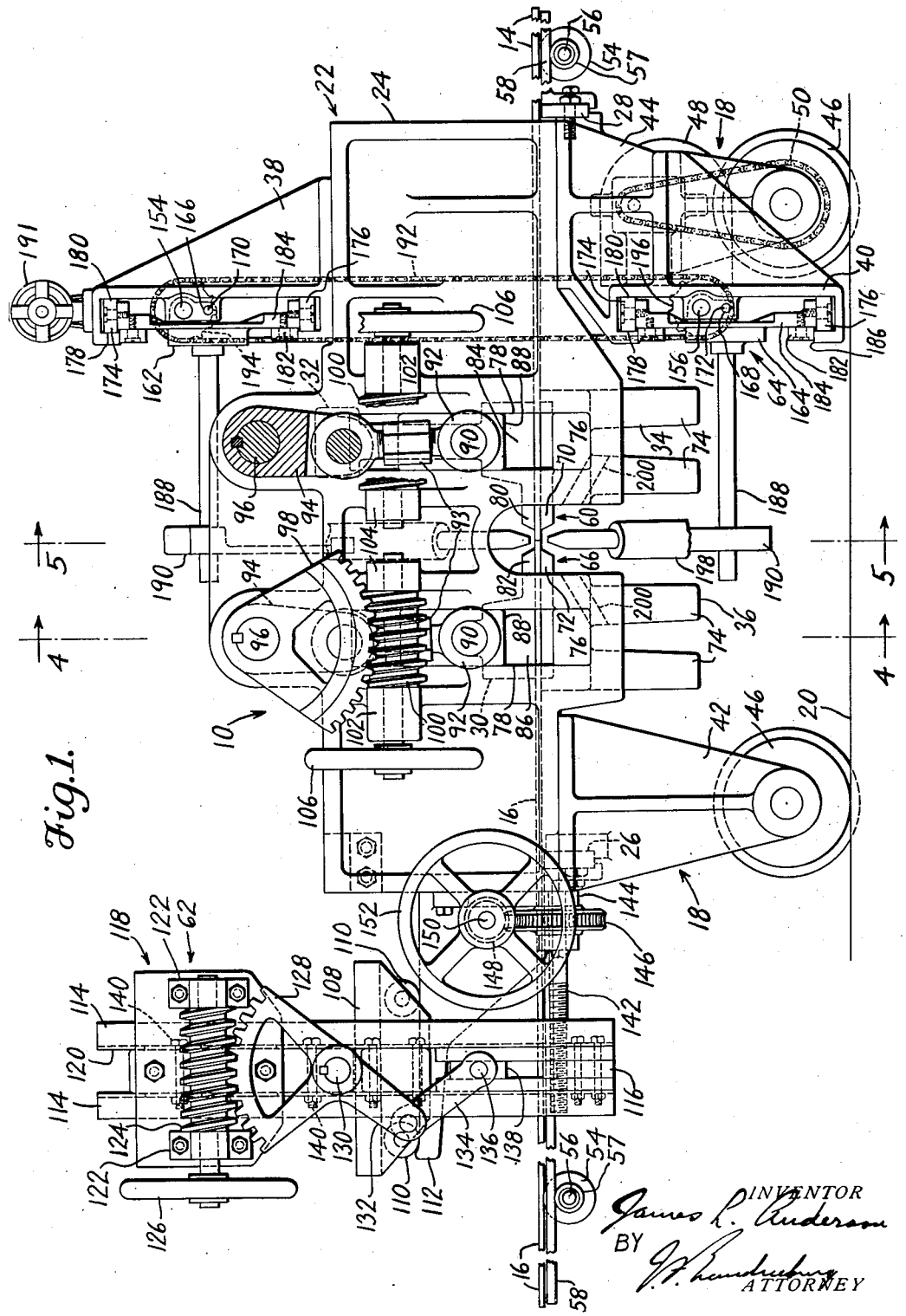
Fig. 1 is a side elevational view of apparatus for effecting and embodying the invention, parts being broken away to illustrate the construction thereof, the torches being shown diagrammatically.

The apparatus 10 for effecting the invention is shown associated with a skelp or like sheet metal rolling mill 12. The end of a sheet 14 of skelp delivered from the mill is deposited upon the apparatus and in the manner hereinafter set forth united to the end of another sheet that has previously been positioned thereupon. The apparatus is intended for feeding a continuously operating pipe forming mill 15, and the sheets or skelp which are discharged from the rolling mill are to be united with, and into a continuous member 16 as such member is continuously fed for further processing, as by bending into tubular skelp before being welded into pipe or tubing. Such continuous member is, therefore, at all times, in motion. To provide means enabling apparatus 10 to move with member 16 as the uniting of additional sheets to such member is effected, the apparatus is mounted upon a wheeled carriage 18 which rides along tracks 20.

The several elements of apparatus 10 are assembled on a frame 22, which comprises a pair of side plates 24, and a number of cross members 26, 28, 30, 32, 34, 36, 38 and 40 which retain the side plates in spaced apart relation. Secured to and extending downwardly from side plates 24 are bracket members 42 and 44, which have bearings for the axles of wheels 46, the latter rolling along the tracks 20 to provide for ready transport of the apparatus relatively to the sheet or skelp, or the continuous member with which the operation is being carried forward. Preferably, a motor drive 48 operating through a chain belt 50 is used to relieve the continuous member of the work necessary to haul the apparatus and the free sheet along with it. Such motive apparatus may also have the function of moving the carriage independently of the movement of the continuous member when returning the apparatus to the end of the track for picking up a new sheet, or for moving up to the end of the continuous member before the latter is engaged by the clamping means hereinafter described.

Figure 2:
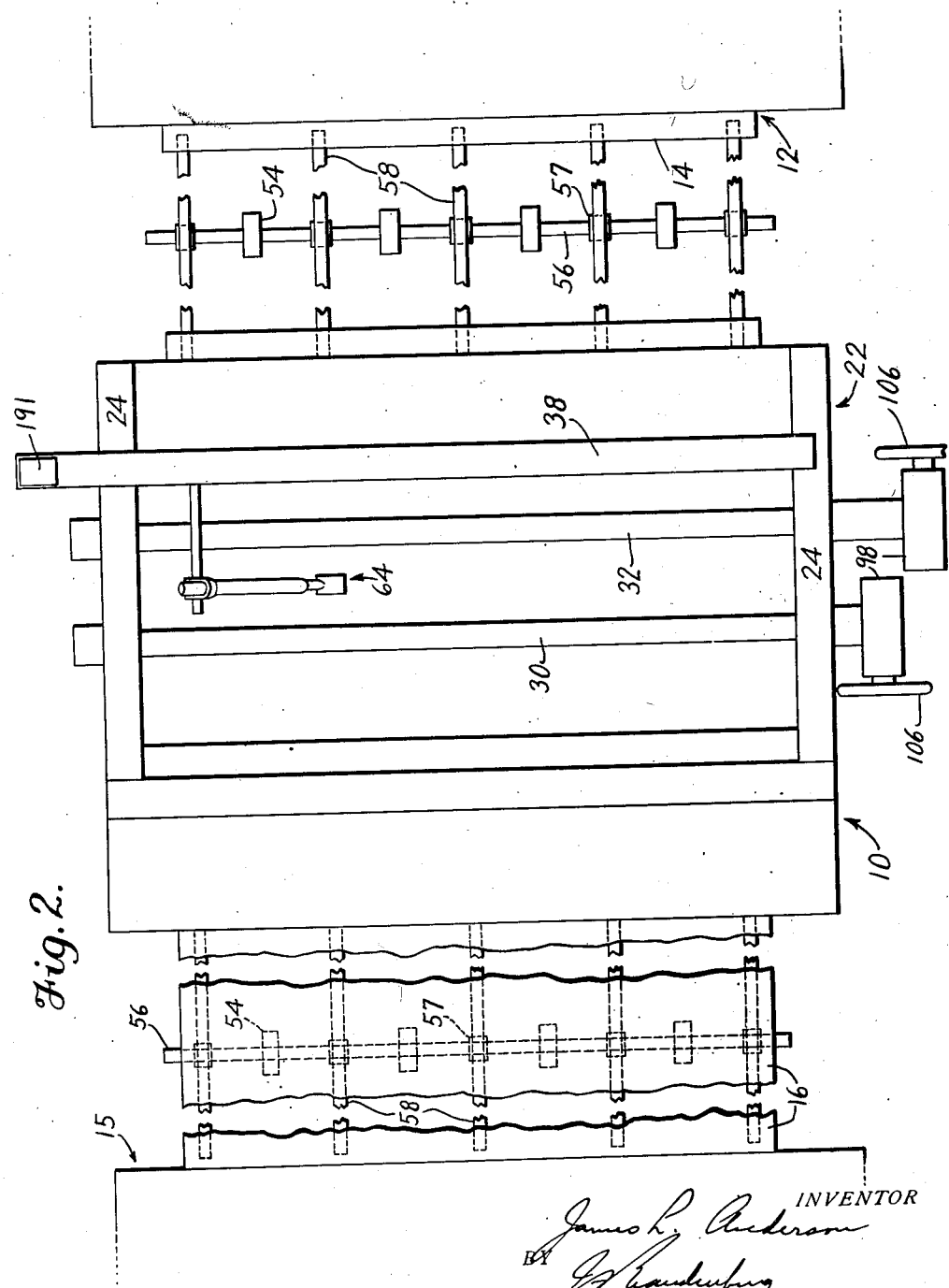
Fig. 2 is a diagrammatic plan view of the apparatus, shown in relation to sheet and pipe forming mills.

Support for the sheet between the mill 12 and the clamps, and for the continuous member beyond the clamps, is provided by rollers 54, which are mounted on axles 56 (Figs. 1 and 2). The cross members 26 and 28 carry a plurality of cantilever arms 58, which are designed to rest upon roller bearings 57, carried by the axles 56, between the rollers 54. The arms 58 are preferably arranged so that their supporting surfaces are slightly below the uppermost surfaces of the rollers 54. Thus, when the apparatus has moved to any considerable distance away from one set of rollers, the arms 58 will provide support for and prevent undesirable sagging of the sheet or the continuous member.

The apparatus includes a primary clamp 60, a secondary clamp 66, and torch supporting and translating mechanism. The top surfaces of the cross members 34 and 36 form the stationary bottom jaws 70 and 72 for the clamps 60 and 66, respectively. These cross members are constructed as bridge or girder members, with reinforcing ribs 74 extending downwardly from each one. Lugs 76 may be formed at the ends of the cross members for reception in guideways 78, cut or otherwise provided in the side plates 24. The upper jaws 80 and 82 for the clamps are the lowermost portions of the vertically movable transverse members 84 and 86, the lateral edges of each of which may be provided with lugs 88 for reception within the guideways 78.

Formed on the lugs 88 are machined bosses 90, each of which provides a bearing for one end of a link 92 provided with a turn-buckle adjustment 93 intermediately thereof. The other end of each link 92 is provided a bearing on a crank 94. The cranks 94 which are connected to the respective transverse members are fixed to individual shafts 96, extending transversely of the apparatus and supported by bearings in the side plates 24. Secured to an end of each shaft where it extends beyond a plate 24, and preferably on that side of the apparatus from which the person in control of the apparatus will be stationed, is a worm gear segment 98, which is engaged and actuated by a worm 100, carried in bearings 102 and 104 on the side plate. Hand-wheels 106 are assembled with each worm and provide means for moving the respective jaws 80 and 82 into position. On rotation of the hand-wheel, the links 92 thereto connected will be actuated by the cranks 94 to force the jaw 80 or 82 toward the corresponding lower jaw and thereby close the clamp. Reverse rotation of the hand-wheel opens the clamp.

A forward carriage 108 has a plurality of wheels 110 which run upon track-ways on a pair of forwardly extending arms 112 of the side plates 24 of the main or after carriage. Secured to the carriage 108 is a pair of column guides 114, between the lower ends of which extends a transverse bar 116, the ends of which are secured in the guides 114 and the upper surface of which is substantially on a level with or slightly above the level of the stationary jaws of clamps 60 and 66. The upper surface of the bar 116 is formed with a plurality of notches 117 (Fig. 3) through which the arms 58 are slidable in their movement relative to the bar.

Heads 118 are slidably disposed in the guides 120, provided by the columns. One of the heads, preferably that one located on the same side of the apparatus as hand-wheels 106, has bearings 122 for a worm 124, operable by a hand-wheel 126. The worm engages a worm-wheel segment 128, which is fixed to a shaft 130, extending transversely of the apparatus. The shaft is provided with bearings in the heads 18. A crank 132 is secured rigidly to each end of the shaft 130, and each crank is pivotally connected to one end of a link 134, the other end of which is pivotally secured to a pin 136. The pins 136 extend from opposite ends of a jaw 138, and the ends of the jaw slide in guideways between columns 114. Heads 118 are vertically adjustable in the guides 120 for accurately positioning the jaw 138 so that, when the cranks 132 and links 134 are brought into substantial alinement, the jaw will clamp the sheet to the bar 116. A set-screw or bolt 140, passing through the head and engaging the columns 114 retains the heads 118 in a set position.

A screw 142 extends into a suitably threaded aperture in the columns 114 at each side of the apparatus. The other end of each screw is supported in a bearing 144 on the side plate; such bearing also provides stops against motion longitudinally of the screw. A worm-wheel 146 is secured to each screw 142. Each worm-wheel is engaged by an individual worm 148, and both worms are mounted upon a common shaft 150, which is operated by the hand-wheel 152. By manipulating the hand-wheel 152, the guide columns 114 may be moved relatively to the apparatus and along the trackways on arms 112.

In operation, one of the sheets just discharged from the rolling mill is positioned at the primary clamp 60, and the clamp is closed by operating the hand-wheel 106 as above described. With the sheet thus retained, the apparatus is pushed or repelled along the tracks 20 until the adjusting mechanism catches up with the end of the moving continuous member and a substantial quantity thereof extends between the bar 116 and the jaw 138, and into proximity to the clamp 66. The jaw 138 is then quickly closed down upon the moving metal to clamp it against bar 116, whereupon the carriage will be coupled to the continuously moving member 16 and move therewith. The hand wheel 152 is then operated to effect relative movement of the member 16 and the main carriage to bring the end of the sheet secured in clamp 60 into properly spaced or abutting relation with the trailing end of the continuous member 16. When this operation has been completed, the clamp 66 is then closed to hold the member 16 and the sheet ends are ready for the welding operation.

The welding of the sheet ends may be performed by any suitable means, such as an oxyfuel gas torch, for example, which may be manually operated to play the welding flame on the seam to be closed while the apparatus moves with the continuous member. However, it is preferable to mount the welding device for controlled mechanical movement relative to the seam while the sheets continue in motion. The translating mechanism may be designed to function with any suitable high temperature welding apparatus, for example, that used in arc welding or like operations, but preferably is designed for the utilization of the oxy-fuel gas method of welding.

For the purposes of this invention, the cross members 38 and 40, supported between the side plates 24 in any desired manner, provide bearings for lead screws 154 and 156, respectively, these lead screws extending parallel to the cross members. The lead screws cooperate with nuts 158 and 160, which are formed as bosses upon torch carriages 162 and 164. Passages 166 and 168 through these bosses permit the bosses to slide on rods 170 and 172, which extend between the side plates, and provide additional support for the torch carriages. Rollers 174 and 176, at the upper and lower faces of the torch carriages 162 and 164, respectively, contact with vertical machined surfaces 178 and 180, respectively, on the cross members, and hold the torch carriages against side play.

The weight of each torch carriage is supported by rollers 182, which are carried by arms 184 and run upon track-ways 186. Extending from each torch carriage is a horizontal bar 188, upon which is mounted a torch holder 190. The torch holder is movable about the bar to secure the desired adjustment. Any suitable type of torch may be utilized for the purposes of this invention, but I prefer to use the multiple jet tip of the type shown in my Patent No. 1,516,486, dated November 25, 1924. It is contemplated, of course, that for certain thicknesses of metal a single torch positioned above the seam may be entirely adequate to make the weld. However, where welding is to be accomplished by simultaneous heating and fusion from above and below the seam, the two torch carriages with their associated torches are used and are simultaneously driven from any suitable power source 191. The power source 191 drives the lead screw 154, which drives the lead screw 156 through a chain 192 on sprocket wheels 194 and 196 secured to the lead screws 154 and 156, respectively. By such means, simultaneous and synchronized movement of the torches relative to the seam is assured.

For the lower torch 198, which travels in the substantially enclosed space between adjacent pairs of reinforcing ribs 74, it is desirable to provide a means of access for atmospheric oxygen in order more efficiently to consume the envelope gases in close proximity to the welding point, and thereby apply the heat derivable from such gases in furthering the welding operation. For this purpose, the angularly upward extending passages 200 (Fig. 1) are provided at suitable spaced apart intervals along the lengths of the ribs 74. By this means, additional access for such atmospheric oxygen is provided. The upper jaws 80 and 82 may also have the transverse members 84 and 86 thereof provided with similar passages for supplying additional atmospheric oxygen to gases formed at the welding point above the seam.

As many changes could be made in the construction and process herein involved and many widely different embodiments of the invention designed without departing from the scope of the invention as defined in the accompanying claims, the matter set forth by the above description may be understood as being illustrative of an operative embodiment of the invention and not in a limiting sense.

I claim:

1. Apparatus for welding mechanically which includes: a pair of carriages constructed for feeding thereacross a traveling sheet, one of said carriages being mounted on the other carriage both of said carriages being mounted for movement with said sheet, means on each of said carriages for securing a metallic sheet thereto, mechanism for varying the position of the carriages relative to each other to bring the end edge of one sheet into welding relation with the other sheet, means for clamping the adjusted sheet in position to be welded to the other sheet, and means supported relatively to said carriages for welding together the two sheets to form a continuous member therefrom, said welding means including a torch carriage supporting torches positioned above and below said end edges and arranged for movement across the positioned sheets, the carriage at the welding position being formed to present air conduits to assist the combustion of gases around said torches.

2. Apparatus for welding mechanically which includes: a pair of carriages constructed for feeding thereacross a traveling sheet, one of said carriages being mounted on the other carriage, both of said carriages being mounted for movement with said sheet, means on each of said carriages for securing a metallic sheet thereto, mechanism for varying the position of the carriages relative to each other to bring the end edges of said sheets into welding position, and means for welding together the two sheets to form a continuous member therefrom, said means being movable transversely of the carriages and parallel to the positioned end edges and including a torch carriage mounted relatively to said carriages and supporting a torch for movement across the positioned sheets.

3. Apparatus for welding mechanically which includes: a pair of carriages constructed for feeding thereacross, a traveling sheet, one of said carriages being mounted on the other carriage, both of said carriages being mounted for movement with said sheet, means on each of said carriages for securing a metallic sheet thereto, mechanism for varying the position of the carriages relative to each other to bring the end edges of said sheets into welding position, and means supported relatively to said carriages for welding together the two sheets to form a continuous member therefrom.

4. Apparatus for welding together the ends of metallic sheets or the like which includes: means for clampingly engaging one of said sheets, mechanism for receiving, initially clamping and moving another sheet into position, relative to the first clamped sheet, for welding thereto, means for then clamping the second sheet in the related position, and means for moving between the clamping means to weld the sheets together, said clamping means being provided with air conducting passages, as and for the purposes set forth.

5. Apparatus for welding together the ends of metallic sheets or the like, which includes: a carriage movable along a fixed track and having thereon means for clampingly engaging one of said sheets, mechanism for receiving, initially clamping and moving another sheet into position relative to the first clamped sheet for welding thereto, means for then clamping the second sheet in the related position, and means mounted for movement transversely of the movement of said carriage for moving along the seam between the two sheets to weld them together.

6. Apparatus for welding together the ends of metallic sheets or the like, which includes: a carriage movable along a fixed track and having thereon means for clampingly engaging one of said sheets, mechanism for receiving, initially clamping and moving another sheet into position relative to the first clamped sheet for welding thereto, means for then clamping the second sheet in the related position, and means for moving along the seam between the two sheets to weld them together.

7. Apparatus for welding together the ends of metallic sheets or the like, which includes: a carriage having thereon means for clampingly engaging one of said sheets, mechanism for receiving, initially clamping and moving another sheet into position relative to the first clamped sheet for welding thereto, means for then clamping the second sheet in the related position, and means for moving along the seam between the two sheets to weld them together.

8. A welding table comprising a pair of spaced apart ledges, means on said ledges for securing metallic members in position to be welded together, said ledges being constructed with reinforcing ribs, extending downwardly therefrom, and air passages extending through said ribs for conducting air to welding devices positioned between said ledges.

9. The method of uniting a sheet metal section to a continuously moving sheet, which method comprises clamping a carriage to the sheet metal section, clamping another carriage to the continuously moving sheet so that this latter carriage moves with the continuously moving sheet, moving the first-mentioned carriage to overtake the second-mentioned carriage and bring the sheet metal section into position to be welded to the continuously moving sheet, holding the section and sheet in such relation while they move in unison, and welding them together while so held.

10. The method of uniting a sheet metal section to a continuously moving sheet, which method comprises applying a clamp to the sheet metal section, applying another clamp to the continuously moving sheet so that this latter clamp moves with the sheet, moving the sheet metal section clamp to bring the front edge of the section into abutting relation with the trailing edge of the continuously moving sheet, preserving this relation while the sheet and section travel in unison, and welding the abutting edges of the sheet and section together while locked in abutting relation.

11. The method of uniting a sheet metal section to a continuously moving sheet, which method comprises clamping the sheet metal section to a carriage, coupling another carriage to the continuously moving sheet, moving the first-mentioned carriage to overtake the second-mentioned carriage, bringing the front edge of the sheet metal section into abutting relation with the trailing edge of the continuously moving sheet, clamping the trailing edge of the continuously moving sheet in such abutting relation, and welding the abutting edges together.

12. Apparatus for welding additional sheet metal sections to a continuously traveling sheet, comprising a carriage, means for clamping a section of sheet metal to said carriage, another carriage, means for clamping the traveling sheet to this latter carriage, mechanism for moving one carriage with respect to the other to bring the edge of the additional sheet into abutting relation with the edge of the traveling sheet, and means for welding the abutting edges together.

13. Apparatus for welding additional sheet metal sections to a continuously traveling sheet, comprising a carriage, means for clamping a section of sheet metal to said carriage, another carriage, means for clamping the traveling sheet to this latter carriage, and means for moving the first-mentioned carriage relatively to the second-mentioned carriage and to the traveling sheet so as to bring the forward end of the additional section into juxtaposition with the trailing end of the traveling sheet.

14. Apparatus for welding additional sheet metal sections to a continuously traveling sheet, comprising a carriage, means for clamping a section of sheet metal to said carriage, another carriage, means for clamping the traveling sheet to this latter carriage, means for moving the first-mentioned carriage relatively to the second-mentioned carriage and to the traveling sheet so as to bring the forward end of the additional section into juxtaposition with the trailing end of the traveling sheet, and means for then clamping the rear end of the traveling sheet to the first-mentioned carriage.

15. Apparatus for welding additional sheet metal sections to a continuously traveling sheet, comprising a carriage, means for clamping a section of sheet metal to said carriage, another carriage, means for clamping the traveling sheet to this latter carriage, an adjustable connection between the carriages operable to move the first-mentioned carriage toward the second-mentioned carriage to bring the forward edge of the additional sheet into abutting relation with the trailing edge of the continuously moving sheet, a clamp on the first-mentioned carriage for holding the trailing edge of the continuously traveling sheet in abutting relation, and welding apparatus carried by one of the carriages for welding said edges together.

16. Apparatus for welding sections of sheet metal to a continuously moving sheet, said apparatus including a carriage; a clamp on said carriage for holding the trailing edge of the continuously moving sheet; and another clamp parallel to the first-mentioned clamp for holding a section of sheet metal with its edge in abutting relation to the edge of the continuously moving sheet, both clamps extending across the entire width of their respective sheets and engaging the sheets adjacent their abutting edges.

17. Apparatus for welding additional sheet metal sections to a continuously traveling sheet, said apparatus comprising two connected carriages, two clamps on one of said carriages to hold the trailing edge of the continuously moving sheet and the forward edge of an additional section in proximate relation for welding, means for operating said clamps separately, means on the other carriage for coupling the carriages to the continuously moving sheet, and means for moving one carriage in relation to the other while both carriages are connected with the continuously moving sheet in order to bring the edges into welding relation.

18. Apparatus for welding additional sheet metal sections to a continuously traveling sheet, said apparatus comprising a main carriage, a secondary carriage thereon, a clamp on the main carriage for holding the forward edge of an additional sheet metal section, a clamp on the secondary carriage for coupling the carriages to the continuously moving sheet, mechanism for moving the main carriage relatively to the secondary carriage to bring the forward edge of the additional section into abutting relation to the trailing edge of the continuously moving sheet, and another clamp on the main carriage for then holding the trailing edge of the continuously moving sheet.

19. The method of producing a continuous member from a plurality of sheet or plate metal sections while the continuous member remains in continuous forward motion, which comprises mechanically coupling an additional section to the continuously moving member, and while the sheets are coupled and both are in movement causing the additional section to overtake the continuous member until the edges are in accurate relation for welding, clamping the sheet metal close to the edges to be united and entirely across the sheet, and then welding the cross seam.

JAMES L. ANDERSON.